United States Patent Office 3,025,231
Patented Mar. 13, 1962

3,025,231
CATALYTIC HYDROGENATION OF HEAVY OILS SUCH AS SHALE OIL
Louis D. Friedman, Beacon, Marvin L. Rambo, Fishkill, and John H. Estes, Wappingers Falls, N.Y., assignors to Texaco Inc., New York, N.Y., a corporation of Delaware
No Drawing. Filed June 3, 1959, Ser. No. 817,724
4 Claims. (Cl. 208—213)

The present invention relates to a novel process employing catalytic hydrogenation for removing organic matter, sulfur and metals from heavy crude oils such as crude shale oil and heavy natural crude oils; and for increasing the naphtha yield therefrom.

Crude shale oil has a high carbon residue and contains large quantities of nitrogen and sulfur. Before such oils may be used commercially the content of these materials must be reduced significantly. Furthermore, a reduction in the amount of carbon residue is desirable in order to prevent the deposition of carbon on catalysts employed in subsequent treating procedures since carbon deposition reduces the life of such a catalyst. Shale oils also contain but little naphtha (Initial Boiling Point (IBP) 400° F.) so that an increase in naphtha is desirable. Two typical shale oils had the following analyses:

|  | A | B |
|---|---|---|
| Gravity, ° API | 20.9 | 23.3 |
| Carbon, Wt. Percent | 84.70 |  |
| Hydrogen, Wt. Percent | 11.6 |  |
| Nitrogen, Wt. Percent | 1.87 | 1.90 |
| Sulfur, Wt. Percent | 0.81 | 0.78 |
| Carbon Residue, Wt. Percent | 4.32 | 3.55 |
| IBP—400° F., Vol. Percent | 3 |  |

Arabian crude oils require similar upgrading, and in addition generally contain high metal content which must be reduced.

In accordance with the present invention the organic matter, sulfur and metals are reduced significantly in such oils by hydrogenating them in the presence of activated carbon as a catalyst. Also, the amount of naphtha yield is increased substantially. The procedure may be carried out either as a batch type operation which is well suited for the laboratory, or in a continuous operation which can be used successfully both in the laboratory and in commercial operation. For example, when using activated carbon as the catalyst during a hydrogenation operation, it is possible to reduce the nitrogen to less than 2%, the sulfur to less than 0.2% and the carbon residue to less than 1% when starting with a heavy oil such as shale oil of the types described above.

In addition to the value of activated carbon alone in this process, we have also found that further improved results are obtained by incorporating with the activated carbon certain metals and metallic compounds as promoters of the reaction. Among these promoters are iron, and oxides of vanadium, tungsten and molybdenum, alone or mixed with one another.

In still another modification of the invention, we have found that activated carbon is useful as a pre-catalyst in a dual catalyst operation, wherein the oil and hydrogen are first passed over a first bed of the activated carbon pre-catalyst bed, with or without a metallic promoter compound, and subsequently are passed over a second bed of another hydrogenation catalyst such as cobalt molybdate or nickel tungsten sulfide which completes the product improvement. In dual catalyst operation the high carbon residue of the crude oil is reduced significantly before the oil encounters the second catalyst bed, with the result that there is little or no carbon deposition on the second catalyst bed. This has the beneficial effect of extending the life of the second catalyst, while at the same time improving the overall liquid recovery compared with conventional coking-hydrogenation processing operations.

In the following description, all grain sizes are expressed as U.S. Standard mesh.

ACTIVATED CARBON ALONE

The principles of the invention as performed with activated carbon alone will be described below as performed in a batch type of operation.

A sample of the oil and the activated carbon were introduced into a bomb of 2630 cc. capacity. The bomb was pressured with hydrogen to approximately ½ the desired operating pressure and the heat was turned on. When the desired temperature was reached additional hydrogen was added to bring the pressure to the desired level and further additions were made during the run whenever the bomb pressure dropped 250–300 p.s.i.g. below operating pressures due to hydrogen consumption. When the pressure within the bomb did not drop for at least one hour, hydrogenation was assumed to be complete and the bomb was cooled and depressured. A stream of nitrogen was bubbled through the hydrated oils to remove dissolved ammonia and hydrogen sulfide gases before the oils were submitted for analysis.

Examples 1–3

Three runs were performed by the batch method described above using granular —4+6 mesh activated cocoanut char and granular activated coal as the catalysts. Temperature was 740° F. and pressure 3000 p.s.i.g. (pounds per square inch gauge). Details of these runs, showing the remarkable improvement over the charge oil, are set forth in Table I below.

TABLE I

|  | Charge | 1 | 2 | 3 |
|---|---|---|---|---|
| Oil Charged, grams |  | 717 | 704 | 718 |
| Grams Carbon |  | ¹ 48 | ² 45 | ² 100 |
| Length of Run, Hrs. |  | 25½ | 26½ | 28½ |
| H₂ Consumption, cu. ft./bbl |  | 725 | 680 | 825 |
| Oil Yield, grams |  | 634 | 646 | 644 |
| Oil Analysis: |  |  |  |  |
| Gravity, ° API | 20 | 32.4 | 30.7 | 35.7 |
| Viscosity, Kin., 150° F | 31 | 2.06 | 2.64 | 1.89 |
| I.B.P.—400° F., vol. Percent | 3 | 30 | 25 | 25 |
| Percent N | 2.6 | 1.7 | 1.95 | 1.46 |
| Percent S | 0.67 | 0.19 | 0.20 | 0.12 |
| Percent Carbon Residue | 4.35 | 0.61 | 0.59 | 0.03 |

¹ Coconut char.
² Coal.

PROMOTED ACTIVATED CARBON

The principles of the invention as performed with promoted activated carbon in a continuous type of operation will be described below.

In the continuous operation-single catalyst technique, a tubular reactor was provided with a bed of catalyst supported on a layer of Berl saddles, and then an additional layer of saddles was introduced above the catalyst. The tubular reactor was enclosed within a jacket containing electrical heating elements making it possible to heat the catalyst bed to various temperatures which were measured by a thermo-couple embedded within the reactor. On starting a run, the reactor was brought to the desired pressure with hydrogen which was recycled through the unit until the desired temperature had been reached. At this point shale oil warmed to 120° F. was charged to the top of the reactor and flowed down through the catalyst bed while hydrogen was continuously added from high pressure storage vessels to replace that used in the reaction, and to keep the reaction pressure constant.

Before product samples were submitted for chemical analysis dissolved ammonia and hydrogen sulfide were removed by heating to 150° F. and bubbling a stream of nitrogen through the oil for 30 minutes.

*Example 4*

A promoted activated carbon catalyst designed to contain 10% iron and 90% carbon by weight was prepared as follows:

Four-hundred and thirty-two grams of Columbia activated petroleum coke carbon grade LC in the form of −48+325 mesh U.S. Standard, which had been dried for three hours at 400° F., were placed in a round bottom flask equipped with a dropping funnel and glass tube. The flask was evacuated to 29 inches of Hg and left under vacuum for one hour. A solution of 346 grams $$Fe(NO_3)_3 \cdot 9H_2O$$

in 600 cc. water was added, mixed thoroughly with the carbon and the vacuum released. After standing overnight the flask was flushed with nitrogen and heated at 250° F. in a slow current of nitrogen until dry. The flask was again evacuated and left for an hour under vacuum. A solution of 200 cc. concentrated $NH_4OH$ in 400 cc. water was added and mixed thoroughly with the carbon. The vacuum was released and the mixture allowed to stand overnight. The contents of the flask were washed three times by decantation with water. The catalyst was dried at 300° F. in a current of nitrogen and then heated at 500° F. for six hours also in nitrogen. Nine-hundred cubic centimeters or 486 grams of black powder were obtained.

During its use for hydrogenation, iron compounds are reduced to metallic iron, as in the case of the other iron-containing catalysts described hereinafter.

Operation of the process with this catalyst is described in Table II below.

*Example 5*

Another promoted catalyst designed to contain 10% iron, 3% molybdenum oxide ($MoO_3$), 87% carbon was prepared as follows:

Four-hundred and eighteen grams of Columbia grade LC activated petroleum-coke carbon, −48+325 mesh U.S. Standard, which had been dried at 400° F. for 3 hours, were placed in a round bottom flask equipped with dropping funnel and glass tube. The flask was evacuated to 29 inches Hg and left under vacuum for one hour. A solution of 346 grams $Fe(NO_3)_3 \cdot 9H_2O$ in 600 cc. water was added, mixed thoroughly with the carbon and the vacuum released. After standing overnight the flash was flushed with nitrogen and heated at 250° F. in a slow current of nitrogen until dry. The flask was again evacuated for one hour and a solution of 18 grams ammonium molybdate in 200 cc. concentrated ammonium hydroxide and 450 cc. water added. After mixing thoroughly, the vacuum was released and the flask allowed to stand overnight. The contents of the flask were washed three times by decantation, dried at 300° F. in a current of nitrogen and heated at 500° F. for 6 hours in nitrogen. Eight-hundred and forty cubic centimeters or 460 grams of black powder were obtained.

Operation of the process with this catalyst is described in Table II below.

TABLE II
[2250 p.s.i.g., 770° F., 10,000 s.c.f./bbl. Recycle, 0.5 v./hr./v. Space Velocity]

| | Charge | 4 | 5 |
|---|---|---|---|
| Catalyst | | Activated Carbon+ 10 Fe. | Activated Carbon+ 10 Fe+ 3MoO₃. |
| Time on Stream, Hrs | | 0–12 | 8–16 |
| ° API | 20.9 | 45.4 | 40.5 |
| IBP–400° F | 3 | 55 | 35 |
| N, percent | 1.87 | 0.71 | 1.22 |
| S, percent | 0.81 | 0.03 | <0.01 |
| Carbon Residue, percent | 4.13 | <0.01 | <0.01 |

*Example 6*

Another promoted catalyst was prepared to contain 7.7% iron and 1.9% tungsten oxide ($WO_3$). This catalyst was prepared as follows:

Five-hundred and twenty-two g. of dried (three hours at 400° F.) activated petroleum carbon were placed in a round bottom flask and thoroughly mixed with a solution of 433 g. $Fe(NO_3)_3 \cdot 9H_2O$ in 400 cc. water. After standing overnight the mixture was partially dried in an evaporating dish on the steam plate and returned to the flask.

A solution of ammonium tungstate was prepared by adding 20 g. $WO_3 \cdot H_2O$ a little at a time with agitation to 50 cc. conc. $NH_4OH$ and 6 cc. water and warming on the steam plate. The solution was decanted from a small amount of undissolved solid, and mixed with 216 cc. conc. $NH_4OH$, 400 cc. water and the activated carbon. After standing over the weekend, the catalyst was washed three times by decantation, dried in the flash in an atmosphere of $N_2$ and heated in $N_2$ at 500° F. for four hours. Six-hundred and nine g. or 1100 cc. of dark brown granules were obtained.

A hydrogenation operation with this catalyst is reported in Table III below.

*Example 7*

An activated carbon catalyst promoted with vanadium oxide ($V_2O_5$) and iron, and containing 7% iron and 2.9% vanadium oxide by weight was prepared as follows:

Five-hundred and twenty-two g. of dried (300° F. overnight) activated petroleum carbon were placed in a round bottom flask. A solution of 433 g. $Fe(NO_3)_3 \cdot 9H_2O$ in 400 cc. water was added, mixed thoroughly with the carbon and allowed to stand overnight. The mixture was partially dried in an evaporating dish on the steam plate and then returned to the flask. A solution of 250 cc. conc. $NH_4OH$ in 400 cc. water was added, mixed thoroughly and allowed to stand overnight. The material was washed three times by decantation.

Eighteen g. $V_2O_5$ were dissolved in 45 g. oxalic acid and 90 cc. water on the steam plate. This solution was added to the carbon, mixed well and allowed to stand overnight. The catalyst was dried in nitrogen and heated for six hours at 800° F. in an atmosphere of nitrogen. Five-hundred and ninety g. or 1160 cc. of brownish black pellets were obtained.

This catalyst was tested for the hydrogenation of shale oil as reported in Table III below.

TABLE III
[2250 p.s.i.g., 10,000 s.c.f./bbl., 0.5 v./hr./v.]

| | Charge | 6 | 7 |
|---|---|---|---|
| Catalyst | | C+Fe+WO₃ | C+Fe+V₂Ol |
| Time on Stream, Hr | | 40–52 | 24–28 |
| Catalyst Temp., ° F | | 830 | 830 |
| ° API | 20.9 | 36.6 | 40.3 |
| IBP–400° F., vol. percent | 3 | 23 | 24 |
| Nitrogen, Wt. percent | 1.87 | 0.84 | 0.69 |
| Sulfur, Wt. percent | 0.81 | 0.07 | 0.07 |
| Carbon Residue, Wt. percent | 4.13 | 0.01 | 0.002 |

DUAL CATALYST OPERATION

When using continuous operation with a dual catalyst combination, wherein the oil was first passed through a bed of activated carbon pre-catalyst and then through a metal oxide catalyst bed, the same general technique was employed except that two separate beds of two types of catalyst were employed, separated from one another by an additional layer of Berl saddles. Thus the oil being treated, together with hydrogen, was first passed through a layer of saddles to a bed of activated carbon, then through another layer of saddles to a bed of metal oxide catalyst, and then through a third layer of saddles and out of the reactor. Both beds may be located in the same reactor tube, or the first bed of activated carbon may be located in a preheater tube upstream of the reactor tube.

Examples 8, 8A

The first catalyst bed was −6+8 mesh activated unpromoted petroleum carbon and the second catalyst bed was commercially available cobalt molybdate from the Harshaw Chemical Company, in the form of a cobalt oxide-molybdena-alumina-silica material containing 3% CoO, 10% $MoO_3$, 80% $Al_2O_3$ and 5% $SiO_2$ ground to −4+10 mesh. Operating results are reported in Table IV below.

Example 9

The first bed was −6+8 mesh granular activated petroleum carbon impregnated with 10% iron as described in Example 4. Operating results are reported in Table IV.

Example 10

The fist catalyst bed was −6+8 mesh granular activated petroleum carbon impregnated with 3% of molybdenum oxide by weight. The impregnated carbon was prepared in the following manner.

Five-hundred and eighty-two g. of dried (300° F. overnight) activated carbon were placed in a round bottom flask. A solution of 22 g. ammonium molybate in 15 cc. conc. $NH_4OH$ and 600 cc. water was added to the flask, mixed thoroughly with the carbon and allowed to stand overnight. The material was dried in an evaporating dish on the stream plate, then in the flask at 800° F. in an atmosphere of nitrogen for six hours. Five-hundred and ninety-six g. or 1160 cc. of black pellets were obtained.

Operating results using this catalyst in combination with cobalt molybdate are described in Table IV.

Example 11

The first catalyst bed was activated petroleum carbon with 10% of iron and 3% of molybdenum oxide as described in Example 5.

Operating results appear in Table IV and Table V, the latter illustrating the wide pressure range of operability.

TABLE V

[0.5 v./hr./v., 10,000 s.c.f./bbl. recycle-catalysts, C+10Fe+3$MoO_3$ cobalt molybdate]

| | Charge | | | |
|---|---|---|---|---|
| Pressure, p.s.i.g. | | 1000 | 1500 | 2250 |
| Catalyst Temp., ° F.: | | | | |
| Precatalyst | | 800 | 800 | 800 |
| Cobalt Molybdate | | 800 | 800 | 860 |
| Time, Hrs. | | 32 | 32 | 72 |
| Product Analysis: | | | | |
| Gravity, ° API | 20.9 | 37.4 | 40.1 | 43 |
| IBP—400° F. | 3 | 25 | 25 | 35 |
| Nitrogen, Wt. percent | 1.87 | 0.47 | 0.23 | 0.07 |
| Sulfur, Wt. percent | 0.81 | 0.05 | 0.02 | 0.02 |
| C residue, Wt. percent | 4.13 | <0.01 | <0.01 | <0.01 |

Example 12

An Arabian crude oil was successfully hydrogenated at a pressure of 1500 p.s.i.g. by the dual catalyst system employing a first bed of C+Fe+$MoO_3$ as in Example 5 and a second bed of cobalt molybdate. The results appear in Table VI.

TABLE VI

[1500 p.s.i.g., 0.48 v./hr./v., 5200 s.c.f./bbl. recycle]

| | Charge | 12 |
|---|---|---|
| Hrs. on stream | | 12.5-18.5 |
| Temperature, ° F.: | | |
| Activated C bed | | 797 |
| Co molybdate bed | | 805 |
| Product Analysis: | | |
| Gravity, ° API | 35.2 | 43.7 |
| Sulfur, Wt. percent | 1.47 | 0.18 |
| C residue, Wt. percent | 2.62 | 0.10 |
| Ni+V, p.p.m. | 6.7 | 1 |

Example 13

The effect of dual catalyst hydrogenation with a nickel-tungsten-sulfide second catalyst bed was also explored. It had been found that with nickel-tungsten-sulfide alone, the hydrogenation of shale oil gave waxy products that plugged the recycle lines. In a test the first catalyst was an unpromoted −4+6 mesh activated cocoanut char. The nickel-tungsten-sulfide catalyst was a standard catalyst sold by the Shell Oil Co. and having the following composition:

| | Percent by weight |
|---|---|
| $NiS_2$ | 19.3 |
| NiO | 11.5 |
| $WS_2$ | 52.7 |
| Inerts bal. | |

Operating results with this combination of catalysts appear in Table VII below. During a 16 hour run the results were excellent with the product having an API gravity of over 40° and a nitrogen content of only .08%. While the product was waxy, the recycle lines did not plug closed during 16 hours of operation.

TABLE IV

[Ex. 8A, 9—1500 p.s.i.g., 10,000 s.c.f./bbl. recycle, 0.5 v./hr./v., Ex. 8, 10, 11—2250 p.s.i.g., 10,000 s.c.f./bbl. recycle, 0.5 v./hr./v.]

| | Charge | 8 | 8A | 9 | 10 | 11 |
|---|---|---|---|---|---|---|
| Precatalyst | | C | C | C+10Fe | C+3$MoO_3$ | C+10Fe+3$MoO_3$ |
| Catalyst Temp. ° F.: | | | | | | |
| Precatalyst | | 800 | 900 | 740 | 800 | 800 |
| Cobalt Molybdate | | 800 | 830 | 770 | 800 | 800 |
| Time, Hrs. | | 24 | 8 | 24 | 24 | 24 |
| Product Analysis: | | | | | | |
| Gravity, ° API | 20.9 | 38.5 | 41 | 36.7 | 38.1 | 38.5 |
| Nitrogen, Wt. Percent | 1.87 | 0.22 | 0.34 | 0.53 | 0.15 | 0.23 |
| Sulfur, Wt. Percent | 0.81 | 0.03 | 0.06 | 0.05 | 0.07 | 0.04 |
| Residue, Wt. Percent | 4.13 | 0.06 | <0.01 | 0.03 | <0.01 | <0.01 |

TABLE VII

[2250 p.s.i.g., 10,000 s.c.f./bbl. recycle, 0.5 v./h./v.]

|  | Charge |  |  |
|---|---|---|---|
| Time on Stream, hr | | 8 | 8–16 |
| Catalyst Temp., °F.: | | | |
|   Carbon precatalyst | | 800 | 800 |
|   Nickel-tungsten-sulfide | | 800 | 800 |
| Product Analysis: | | | |
|   °API | 20.9 | 41.1 | 39.5 |
|   IBP–400° F., vol. percent | 3 | 27 | 24 |
|   Nitrogen, Wt. percent | 1.87 | 0.057 | 0.087 |
|   Sulfur, Wt. percent | 0.81 | 0.06 | 0.04 |
|   Carbon Residue, Wt. percent | 4.13 | 0.002 | 0.001 |

Specific operations employing the principles of the invention have been described in detail above. A few general observations are offered concerning the conditions of operations indicating that the scope of the invention is not limited to the specific conditions set forth in the operating examples.

For example both pressures and temperatures may vary over a substantial range while still producing good results e.g. a pressure range of 1000 to 3000 p.s.i.g. and a temperature range of 740 to 900° F. are operable. Furthermore, space velocities may vary substantially as between 0.5 and 1.0 v./hr./v.

The recycle rate generally employed was 10,000 S.C.F./bbl. but this obviously will vary widely in accordance with the size of the operation being employed and thus should impose no limitations upon the scope of this invention.

Obviously, many modifications and variations of the invention, as hereinbefore set forth, may be made without departing from the spirit and scope thereof, and therefore only such limitations should be imposed as are indicated in the appended claims.

We claim:

1. A process for upgrading a heavy oil having a high carbon residue which comprises contacting said oil in the presence of hydrogen at a temperature between about 740 and 900° F. and a pressure between about 1000 and 3000 p.s.i.g. with a catalyst comprising activated carbon promoted with about 7% by wt. iron and about 3% by wt. vanadium oxide.

2. A two-stage process for the upgrading of a heavy oil having a high carbon residue which comprises contacting said oil in the presence of hydrogen at a temperature between about 740 and 900° F. and a pressure between about 1000 and 3000 p.s.i.g. with a catalyst comprising activated carbon promoted with about 7% by wt. iron and about 3% by wt. vanadium oxide in a first stage and contacting the reaction products at a temperature about 770 and 830° F. with a catalytic material comprising a catalyst selected from the group consisting of molybdenum oxide and nickel-tungsten-sulfide in a second stage.

3. The process of claim 2 in which the catalytic material comprises nickel-tungsten-sulfide.

4. The process of claim 2 in which the catalytic material comprises molybdenum oxide.

References Cited in the file of this patent

UNITED STATES PATENTS

| 1,908,286 | Dorrer | May 9, 1933 |
| 2,671,754 | De Rosset et al. | Mar. 9, 1954 |
| 2,766,179 | Fenske et al. | Oct. 9, 1956 |
| 2,769,754 | Sweetser | Nov. 6, 1956 |
| 2,771,401 | Shepherd | Nov. 20, 1956 |
| 2,901,423 | Herbert et al. | Aug. 25, 1959 |